United States Patent [19]
van den Berg

[11] Patent Number: 6,038,030
[45] Date of Patent: Mar. 14, 2000

[54] METHOD OF ESTABLISHING THE PRESENCE OF SPECIFIC SUBSTANCES IN MILK AS WELL AS AN IMPLEMENT FOR APPLYING SAME

[75] Inventor: Karel van den Berg, Bleskensgraaf, Netherlands

[73] Assignee: Maasland N.V., Maasland, Netherlands

[21] Appl. No.: 09/152,699

[22] Filed: Sep. 11, 1998

Related U.S. Application Data

[63] Continuation of application No. PCT/NL98/00013, Jan. 8, 1998.

[30] Foreign Application Priority Data

Jan. 13, 1997 [NL] Netherlands ............................ 1004980

[51] Int. Cl.[7] ................................. G01J 3/46; A01J 7/00; A01J 5/007
[52] U.S. Cl. ........................................ 356/425; 119/14.08
[58] Field of Search ..................................... 356/425, 402, 356/72, 73.1; 119/14.02, 14.08, 14.18, 14.14

[56] References Cited

U.S. PATENT DOCUMENTS

| | | | |
|---|---|---|---|
| 4,190,020 | 2/1980 | Tamas et al. ......................... | 119/14.08 |
| 5,704,311 | 1/1998 | Van Den Berg ...................... | 119/14.02 |
| 5,762,020 | 6/1998 | Van Der Lely ....................... | 119/14.08 |

*Primary Examiner*—Robert H. Kim
*Assistant Examiner*—Layla Lauchman
*Attorney, Agent, or Firm*—Penrose Lucas Albright

[57] ABSTRACT

A method and apparatus for detecting the presence of specific substances, such as contaminates, in milk from individual animals obtained at consecutive milkings. With the aid of a color sensor measuring system, the intensity of frequency bands of selected colors (red, yellow and blue) are determined and stored as data for each animal being milked in a computer for each milking. In the course of each milking of each animal, the animal's intensity values are compared both mutually and with corresponding intensity values recorded during one or more previous milkings. The results of the comparison are displayed on a computer monitor and/or in a printed record. The milk line system includes a diversion valve disclosed between the receptacle receiving milk from the teat cups and a bulk milk tank for diverting contaminated milk as sensed by the color sensor measuring system and detected by comparisons in the computer before that milk is conveyed to the bulk milk tank.

13 Claims, 1 Drawing Sheet

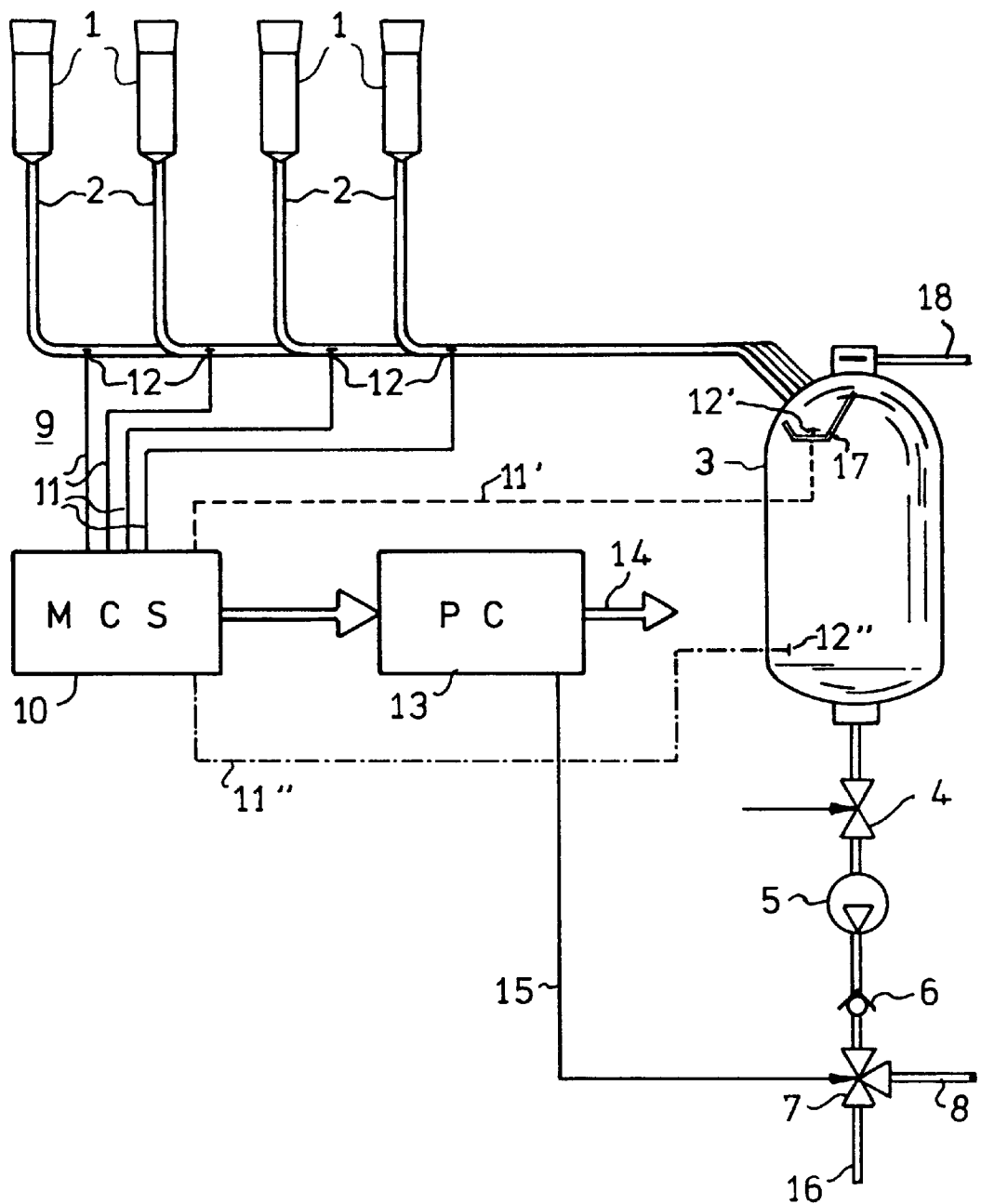

METHOD OF ESTABLISHING THE PRESENCE OF SPECIFIC SUBSTANCES IN MILK AS WELL AS AN IMPLEMENT FOR APPLYING SAME

RELATED APPLICATION

This Application is a continuation of International Application No. PCT/NL98/00013, filed Jan. 8, 1998.

FIELD OF THE INVENTION

The present invention relates to a method of detecting the presence of specific substances, such as contaminates, in the milk yielded from individual animals and obtained at consecutive milkings.

BACKGROUND OF THE INVENTION:

Such a method is disclosed in German Offenlegungsschrift 27 59 126. In this known method a color sensor is employed that reacts to contaminates in the milk, such as blood or pus. The invention aims at providing a more universal method of determining the presence in milk of specific substances, such as contaminates, in which method the composition of the milk, which is specific for each animal, is taken into account.

SUMMARY OF THE INVENTION

In accordance with the invention, the method described above is characterized in that with the aid of a color sensor measuring system the intensity of frequencies in a number of defined frequency bands, in particular the intensity of a number of defined colors in the milk, is determined; that the intensity values thus obtained are stored in a computer data file for each relevant animal; that these intensity values are compared both mutually and with corresponding intensity values recorded during one or more previous milkings, and that the results of this comparison process are displayed. By means of the color sensor measuring system, in particular the intensity of the individual colors in the milk obtained from the separate udder quarters can be determined. According to the method described and depicted herein, the intensity values determined each time are compared with the previously determined, so-called historical values therefor. This method implies in particular that the intensity values obtained at each milking can be compared with corresponding calibration values, while a calibration value can be formed by a running average of the intensity values obtained for a specific animal during a defined number of most recent milkings. When applying the method described and depicted herein it is furthermore important that the results of the comparison process are obtained in such a manner that the presence in the milk of specific substances, such as contaminates, can be read directly therefrom.

Besides the method, the invention also relates to an apparatus for applying the method described and depicted herein for determining the presence of specific substances, such as contaminates, in the milk yielded from individual animals and obtained at consecutive milkings. For that purpose, the apparatus is characterized in that it is provided with a color sensor measuring system including one or more sensors that are accommodated in the milk line circuit of an automatic milking system to determine the intensity of frequencies in a number of defined frequency bands, in particular, the intensity of a number of defined colors in the milk, as well as a computer connected to said color sensor measuring system, in which computer the intensity values thus obtained are stored in a data file therein for a relevant animal, and these intensity values are furthermore compared both mutually and with corresponding intensity values recorded during one or more previous milkings, while additional means are provided which are connected to the computer for the purpose of indicating the results of this comparison process. The sensors are preferably disposed in the milk lines extending from each of the teat cups of the automatic milking system. When it appears from the comparison process that there are objectionable amounts of undesirable substances in the milk, the computer can supply a signal to a valve included in the milk line system, via which valve the milk containing these undesirable substances can be separately discharged.

BRIEF DESCRIPTION OF THE DRAWING

For a better understanding of the invention reference will now be made to the accompanying drawing which shows schematically that part of an automatic milking system in which the application of the invention is expressed.

DETAILED DESCRIPTION OF THE PREFERRED EMBODIMENTS

The drawing shows four teat cups 1 to be connected to the teats of an animal to be milked. The milk discharge tubes 2 of the teat cups 1 debouch into a milk glass 3. To milk glass 3 there is furthermore connected a vacuum line 18 for providing vacuum in milk glass 3, in milk discharge tubes 2 and in teat cups 1, which vacuum is required to retain the teat cups on the teats of the animal being milked, for milking and for separating milk and air present therein in milk glass 3. Via a valve 4, a pump 5, a non-return valve 6 and a three-way valve 7, the milk received in milk glass 3 is discharged from milk glass 3 through a line 8 to a bulk milk tank (not shown).

The drawing additionally shows a color sensor measuring system 9 comprising a color intensity processing unit (MCS) 10, to which four sensors 12 are connected via glass fiber cables 11. These sensors 12 are accommodated in milk lines 2 to determine the intensity of a number of defined colors in the milk and to supply signals representing these intensities to processing unit 10. As color sensor measuring system the Modular Color Sensor system CS1 of Stracon Messsysteme GmbH, Im Camisch 10, Kahla can be used. The sensors utilized in this system are sensitive to frequencies in frequency bands for red, green and blue. Therefore, for each measurement there are supplied three signals which can be considered as intensity values for these three colors. For milk of a constant composition these three intensity values will have a fixed mutual relation, which relation, however, is disturbed as soon as the milk contains a contaminate. To the color sensor measuring system 9 is connected a computer (PC) 13 in which for each animal to be milked there is present a data file in which all data required for milking a relevant animal are stored. At each milking also the obtained three intensity values of the relevant colors in the milk are recorded. These intensity values stored at each milking constitute the so-called historical intensity values. From the historical intensity values, which have been obtained for a relevant animal during a defined number of most recent milkings, the moving average thereof can be determined. The intensity values obtain at a next milking can be compared with this moving average, i.e, the most recently obtained intensity value of each of the three colors can be compared with the corresponding intensity value which is recorded as a moving average in the computer. In other words, the intensity values are compared both mutually and with corresponding intensity values recorded during one or more previous milkings. This comparison process takes place in computer 13. Subsequently, the results of this comparison process can be provided so that the presence in the milk of specific substances, such as contaminates, can be read directly therefrom. Via line 14 these results are supplied to a viewing screen or a printer.

Instead of determining the moving average of the intensity values for each of the colors, it is also possible to establish in another manner a calibration value for each color. It is possible to apply calibration values that could prevail for the milk obtained from all the animals. In that case it will not be necessary to dispose a sensor 12 in each of milk discharge tubes 2, but it may be disposed in milk glass 3 that has an overflow reservoir 17 in which a sensor 12' is accommodated, which sensor 12' is connected to processing unit 10 via a glass fiber cable 11' represented by a dashed line. As a further alternative, a sensor 12" can be disposed in the lower part of milk glass 3. Also in the latter case the sensor has to be connected to the processing unit 10 via a glass fiber cable 11".

However, in all cases it applies that, when unacceptable amounts of undesirable substances appear to be present in the milk, a signal is transmitted by computer 13 via line 15 to three-way valve 7, by means of which valve and conduit 16 connected thereto the milk containing these undesirable substances can be discharged separately.

When, for example, the milk is contaminated by blood, the intensity value supplied by sensor 12 for the color red will be higher than in case of milk free from blood. Then, the intensity value will be higher than the moving average established on the basis of the historical intensity values or higher than the calibration value applied. Also when the milk does not contain contaminates, changes in the concentration of substances that are normally present in the milk may be determined. For example, when in the course of the lactation period the fat content of the milk changes, the mutual relation of the three intensity values that are ascertained during each milking run will change as well.

Inasmuch as the composition of the milk varies for different animals, which is visually perceptible from their colors, the intensity values for the three colors will have a different relative value for different animals. Therefore, it is advantageous to determine the intensity value for each animal individually at each milking and to compare them with calibration values or, in particular, moving averages established for this specific animal.

Although I have disclosed the preferred embodiments of my invention, it is to be understood that it is capable of other adaptations and modifications within the scope of the following claims.

What is claimed is:

1. A method of ascertaining the presence of specific substances, such as contaminates, in the milk obtained from individual animals at consecutive milkings, comprising determining with the aid of a color sensor measuring system, the intensity values of frequencies in a plurality of predetermined frequency bands which exist in milk, storing the intensity values thus obtained in a data file of a computer for a relevant animal, comparing said intensity values with corresponding intensity values of the same animal's milk recorded during at least one previous milking and displaying the results of such comparison.

2. A method as claimed in claim 1, wherein the intensity values of said predetermined frequency bands are determined for milk obtained from the separate udder quarters of the same animal.

3. A method as claimed in claim 1, comprising calibration values for said intensity values which have been entered in a data file of said computer, the method comprising the further step of comparing the intensity values obtained for each milking with said calibration values.

4. A method as claimed in claim 3, wherein said calibration values are formed by the moving average of the intensity values obtained for a specific animal during a predetermined number of said specific animal's most recent milkings.

5. A method as claimed in claim 1, wherein the results of said comparing step are displayed so that the presence of contaminates can be read directly therefrom.

6. In an automatic milking system which comprises a plurality of teat cups, a milk line circuit comprising tubes interconnecting each said teat cup with a receptacle and a discharge conduit from said receptacle to a bulk milk tank, and computer means for governing the operations of the automatic milking system, apparatus comprising a color sensor measuring system including at least one sensor which is disposed in said milk line circuit, said color sensor measuring system determining the intensity of frequencies of a plurality of predetermined frequency bands which appear in milk, said computer means connected to said color sensor measuring system, said computer means having a data file for each animal milked by the automatic milking system, said data file storing for each animal being milked intensity values obtained from said color sensor measuring system in said predetermined frequency bands for each milking of each animal, said computer means comprising comparison means for comparing said intensity values of each animal being milked with corresponding prior intensity values recorded for the corresponding animal during previous milkings, display means connected to said computer means that display the results provided by said comparison means.

7. An apparatus in accordance with claim 6, comprising a plurality of said sensors, said sensors being disposed in said milk tubes.

8. An apparatus in accordance with claim 6, comprising at least one valve in said milk line circuit between said teat cups and said bulk milk tank for diverting milk in said milk line circuit from being received by said bulk milk tank, control means for said valve connected to said computer means whereby when said computer means, on the basis of results from said comparison means, determines that unacceptable amounts of undesirable substances are present in milk being received from an animal, said computer means signals said control means which controls said valve to divert milk from said animal from being received by said bulk milk tank.

9. An automatic milking system comprising a milk line system, a plurality of teat cups, a receptacle, each of said teat cups being connected by said milk line system to convey milk from each of said teat cups to said receptacle, vacuum means for producing a vacuum in said receptacle, a bulk milk tank, a line between said receptacle and said bulk milk tank in said milk line system, a color sensor measuring system, at least one sensor in said milk line system determining the intensity of selected colors in milk being conveyed in said milk line system from said teat cups through said receptacle, computer means connected to said color sensor measuring system for storing the intensities of said selected colors for each animal milked by the automatic milking system and comparing the intensities of the colors for each animal being milked in said automatic milking system with data received for previous milkings of each said animal to determine the presence of unacceptable substances therein which have changed the intensity of at least one of said selected colors, a diversion valve in said milk line system controlled by said computer means which diverts milk flowing in said milk line system therefrom so that it is not received by said bulk milk tank when the presence of unacceptable substances have been detected in such milk.

10. An automatic milking system in accordance with claim 9, wherein a plurality of said sensors are disposed in said milk line system between each of said teat cups and said receptacle.

11. An automatic milking system in accordance with claim 9, comprising a reservoir in the upper aspect of said receptacle for receiving milk from said teat cups, said sensor being disposed in said reservoir.

12. An automatic milking system in accordance with claim 9, wherein said sensor is disposed in the lower aspect of said receptacle.

13. An automatic milking system in accordance with claim 9, wherein said diversion valve is disposed in said milk line system between said receptacle and said bulk milk tank.

* * * * *